US005930468A

United States Patent [19]

Zingher et al.

[11] Patent Number: 5,930,468

[45] Date of Patent: Jul. 27, 1999

[54] METHOD AND DEVICE FOR USE IN THE PRODUCTION OF PRINTING PRODUCTS

[75] Inventors: Oded Zingher, Alzenau; Peter Biernot, Muhlheim, both of Germany

[73] Assignee: MAN Roland Druckmaschinen AG, Germany

[21] Appl. No.: 08/904,065

[22] Filed: Aug. 1, 1997

[30] Foreign Application Priority Data

Aug. 3, 1996 [DE] Germany ........................... 196 31 469

[51] Int. Cl.$^6$ ..................................................... G06K 15/00

[52] U.S. Cl. ............................................ 395/115; 395/112

[58] Field of Search .................................... 395/101, 109, 395/111, 112, 113, 114, 115, 826, 836, 837, 838, 839, 860, 861, 862, 863, 864, 874, 872; 358/404, 403, 444

[56] References Cited

U.S. PATENT DOCUMENTS

| | | | |
|---|---|---|---|
| 4,399,749 | 8/1983 | Arai . | |
| 4,680,625 | 7/1987 | Shoji et al. . | |
| 5,010,820 | 4/1991 | Loffler . | |
| 5,081,595 | 1/1992 | Morena et al. | 395/111 |
| 5,174,210 | 12/1992 | Rodi et al. . | |
| 5,327,526 | 7/1994 | Nomura et al. | 395/115 |
| 5,535,009 | 7/1996 | Hansen . | |

FOREIGN PATENT DOCUMENTS

| | | |
|---|---|---|
| 0 453 855 B1 | 7/1994 | European Pat. Off. . |
| 31 28 360 C2 | 7/1986 | Germany . |
| 35 05 480 A1 | 9/1986 | Germany . |
| 37 07 695 C2 | 1/1991 | Germany . |
| 32 29 279 C2 | 2/1994 | Germany . |
| 35 25 414 C3 | 1/1995 | Germany . |
| 44 45 393 A1 | 8/1995 | Germany . |

OTHER PUBLICATIONS

DE–Z dwl/Jan. 1996, S. 34–36, Prepress Komplett.

DE0Z: elektronikpraxis–Nr. 12—Dec. 1978, by Steinwender.

DE–Prospekt: Man Roland, Digital Change Over, 4.95, Jan. 86.

*Primary Examiner*—Arthur G. Evans

*Attorney, Agent, or Firm*—Leydig, Voit & Mayer, Ltd.

[57] ABSTRACT

A printing device for the production of a plurality of print jobs having different image contents. The execution time, as well as the correspondingly necessary working steps for producing the printing form having the different image contents of the individual print jobs is intended to be optimized or minimized, so that a printing machine which is operated in accordance with this method or is effectively connected to such a data processing device is able to produce the largest possible number of print jobs in a predefined time. According to the invention, this is achieved in that the image contents of the various print jobs are compared with one another pixel by pixel and in the respective color separations, whereupon the defining of the execution sequence for producing the print jobs is performed to the effect that, for example, the number of working steps needed to rewrite an existing printing form for the next printing form and/or the execution time needed for this, is minimal.

22 Claims, 5 Drawing Sheets

METHOD AND DEVICE FOR USE IN THE PRODUCTION OF PRINTING PRODUCTS

BACKGROUND OF THE INVENTION

This invention relates generally to the field of printing and, more particularly, relates to a method and a printing device for use in the production or printing products.

In the prior art, the carrying out of a plurality of print jobs following one after another, in particular in the case of sheet-fed, offset printing machines, is predominantly controlled in accordance with purely operational and economic or time aspects. The individual print jobs are allocated to one or more printing machines in accordance with a given priority in order to achieve the highest possible machine utilization, and the print jobs are then processed one after another on the printing machine or machines. A job change from one just carried out to the next print job typically requires, in the case of a sheet-fed, offset printing machine, essentially the changing of the printing plates as well as the possible changing of the printing inks present in the individual printing units and the material to be printed in the feeder. The corresponding devices, in particular for supplying the material to be printed in the feeder and deliverer, must at the same time be set appropriately as a function of the job. In the case of modern sheet-fed offset printing machines, this takes place automatically by means of remotely adjustable devices whereby the changeover times for a job change can be shortened.

For example, DE 37 07 695 C2 discloses a method for the defined distribution of ink in the inking unit of rotary printing machines for setting up an ink gradient which allows the unit to achieve close to continuous printing. This is achieved by changing ink metering elements in a targeted manner during a job change, starting from an initial position, and taking into account the setting envisaged in the case of the next job. By this means, the number of machine revolutions over which the ink gradient is then established on the rolls of the inking unit is minimized. This method is used in connection with an already defined sequence of print jobs.

By way of further example, EP 0 453 855 B1 discloses a method for the elimination and for the reconstruction of an ink profile of the inking unit of an offset, rotary printing machine. Provision is made for the complete inking of the printing form by throwing off the damping solution feed in order to equalize the previous ink profile which has been brought about by the previous print job. The ink profile originating from the previous print job is thereby reduced to an envisaged minimum film thickness so that the result is a shortening of the time interval between the changeover from one print job to the next print job. Again, this method is used in connection with an already defined sequence of print jobs.

As yet another example, DE 44 45 393 A1 discloses a copying and/or printing device in which a so-called buffer store is provided which, in order to carry out appropriately prioritized print jobs as rapidly as possible, can be changed over from a first-in/first-out sequence into a first-in/last-in sequence. Accordingly, in the first mentioned mode of operation, print jobs following one another are carried out in the sequence in which they were written into the buffer store. A print job which is marked with an appropriate priority effects the above described sequence changing the sequence into the first-in/last out sequence, with the result that this print job can be carried out immediately or as rapidly as possible. In the case of this device, although there is flexibility with respect to the execution sequence of successive print jobs, the printing is performed using an already defined allocation of priorities.

As a yet further example, DE 31 28 360 C2 discloses a matrix printer which is equipped in such a way that, using one and the same printer, two or more different printed documents can be produced. To this end, the printer has a printing buffer store, an input buffer store and a sorting store, so that the information which is downloaded to the device is separated and sorted in such a way that the individual information blocks are printed onto the printed documents in any desired sequence and arrangement.

Nowadays, increasing use is being made of printing machines having electronically writable or rewritable printing forms. Such digital printing machines, by means of which a so-called digital changeover can be carried out, are employed particularly when low issue levels are to be produced in the shortest time. However, short-run printing devices need high utilization with respect to the printing time for their practical use in order to be able to be employed profitably. Depending on the principle used for the writing or rewriting of the printing forms, specific minimum times between two print jobs have to be provided. As in the case of conventional printing machines, a complete rewriting of a printing form with the entire image content is performed in accordance with the print job to be carried out at that time. This has the effect that, during a job change from an existing to the next print job, the previous image contents have to be erased (for example by means of a specific image cleaning device) in order then to provide the printing forms or the corresponding cylinders with the image contents of the new print job. The term "writing image information" onto a printing form or onto a printing form cylinder is to be understood here and below as any generation or structuring of parts, in particular, ink-carrying/ink-accepting and non-ink-carrying/non-ink-accepting parts.

In particular, writing to a printing form typically requires, for example, in the flat printing process, producing the ink-accepting regions corresponding to the structure envisaged for the print by means of electrical, thermal, mechanical or optical treatment of a starting material. Before a subsequent image is printed, a so-called erasure of the printing forms takes place. This erasure occurs in a similar manner with the image content being transferred once more into an initial state, for example, by means of full-area thermal, mechanical, electrical or optical action on the appropriate substrate. The writing step is then performed in order to generate a new printing form having the image content for the next print job. The processing operations outlined using the example of a rewritable flat printing form are to be carried out appropriately in an analogous way in the case of a process designed as a rewritable gravure process. The writing of the printing form utilizing this process essentially comprises a generation of tiny bowls of designed depth in accordance with the image information to be transferred during the printing. The erasure of the printing form accordingly comprises refilling all the little bowls of the previous print job.

While each of these above described examples work for their intended purpose, there is seen to be a need for a still more efficient method and device for use in the production of printing products.

OBJECTS AND SUMMARY OF THE INVENTION

It is a general object of the present invention to provide a method for use in the production of printing products which is more efficient and economical from those methods and devices found in the prior art. More particularly, it is an object of the present invention to provide a method which allows for the optimized use of time during the production of a plurality of issues of printed material. In particular, it is intended that the amount of time and the working steps necessary for changing from one print job to the next be optimized in terms of time and also in terms of process and economy of materials.

According to the invention, provision is made in terms of the method that, in order to determine the sequence in which the individual print jobs are carried out one after another, the image contents belonging to the individual print jobs are compared with one another in pairs and, in so doing, the changes which are respectively necessary to carry out a subsequent print job with a new image content are determined with respect to a previous print job. In this case, compared with one another in pairs means that, depending on the color separation, two image contents are compared on a pixel by pixel basis or image data may be combined in some manner, for example, averaged, before being compared. In the case of multicolor print jobs, the image contents of the respective color separations and the image contents and color separations of the respective print jobs are compared with one another pixel by pixel. In this manner, preferably a printing form of a print job carried out within the sequence is converted point by point or pixel by pixel into the printing form of the next print job with only those points or pixels in the image content which differ between the print jobs experiencing processing.

To perform this method, the points or pixels which are needed as non-printing components with respect to the print job carried out may first be transferred into a non-printing state and, thereafter, the points or pixels which are needed as printing components according to the image content of the next print job are transferred into a printing state. Conversely, as an alternative thereto, the points or pixels which are needed as printing components according to the image content of the next print job may be transferred into a printing state and, thereafter, the points or pixels which are needed as non-printing components with respect to the next print job are transferred into a non-printing state.

In yet a further embodiment of the invention, when defining the sequence in which the individual print jobs are carried out one after another, a check is carried out to see whether a further print job can be inserted in the short term between at least one pair of print jobs, a reservation being performed for those print jobs whose image contents or variables which can be derived from the image contents lie within specific limits. That is to say, a spacer is provided between two print jobs in a specific manner, which can be replaced or filled in the short term by a new print job or by a plurality of new print jobs.

When defining the sequence in which the individual print jobs are to be carried out one after another, the quality to be achieved in the respective print job is also preferably taken into account.

A further preferred procedure provides that the sequence in which the individual print jobs are carried out one after another is determined anew by comparing the image contents of all the image contents following the print job being carried out.

According to the foregoing, it is seen that the sequence in which the individual print jobs are carried out one after another is defined in such a way that the number of working steps needed to change at least one printing form to the next printing form is minimal (optimal), and/or the time necessary to change at least one printing form to the next printing form is minimal (optimal), the time to change the ink profile and/or film thickness gradient in the inking unit of a printing machine carrying out the print jobs is minimal (optimal) and/or the number of machine revolutions of a printing machine carrying out the print jobs to change the ink profile and/or the film thickness gradient in the inking unit is minimal (optimal). Furthermore, it is seen that the sequence in which the individual print jobs are carried out one after another is defined in such a way that the setting time needed to change from at least one print job to the next print job is minimal (optimal) and/or the number of working steps needed to change from at least one print job to the next print job is minimal (optimal). It is also possible that the sequence in which the individual print jobs are carried out one after another is defined in such a way that the power required to change at least one printing form to the next printing form is minimal (optimal).

A better understanding of the objects, advantages, features, properties and relationships of the invention will be obtained from the following detailed description and accompanying drawings which set forth an illustrative embodiment and which are indicative of various ways in which the principals of the invention may be employed.

BRIEF DESCRIPTION OF THE DRAWINGS

For a better understanding of the invention, reference may be had to a preferred embodiment shown in the following drawings in which.

DETAILED DESCRIPTION OF THE DRAWINGS

Figure 1:
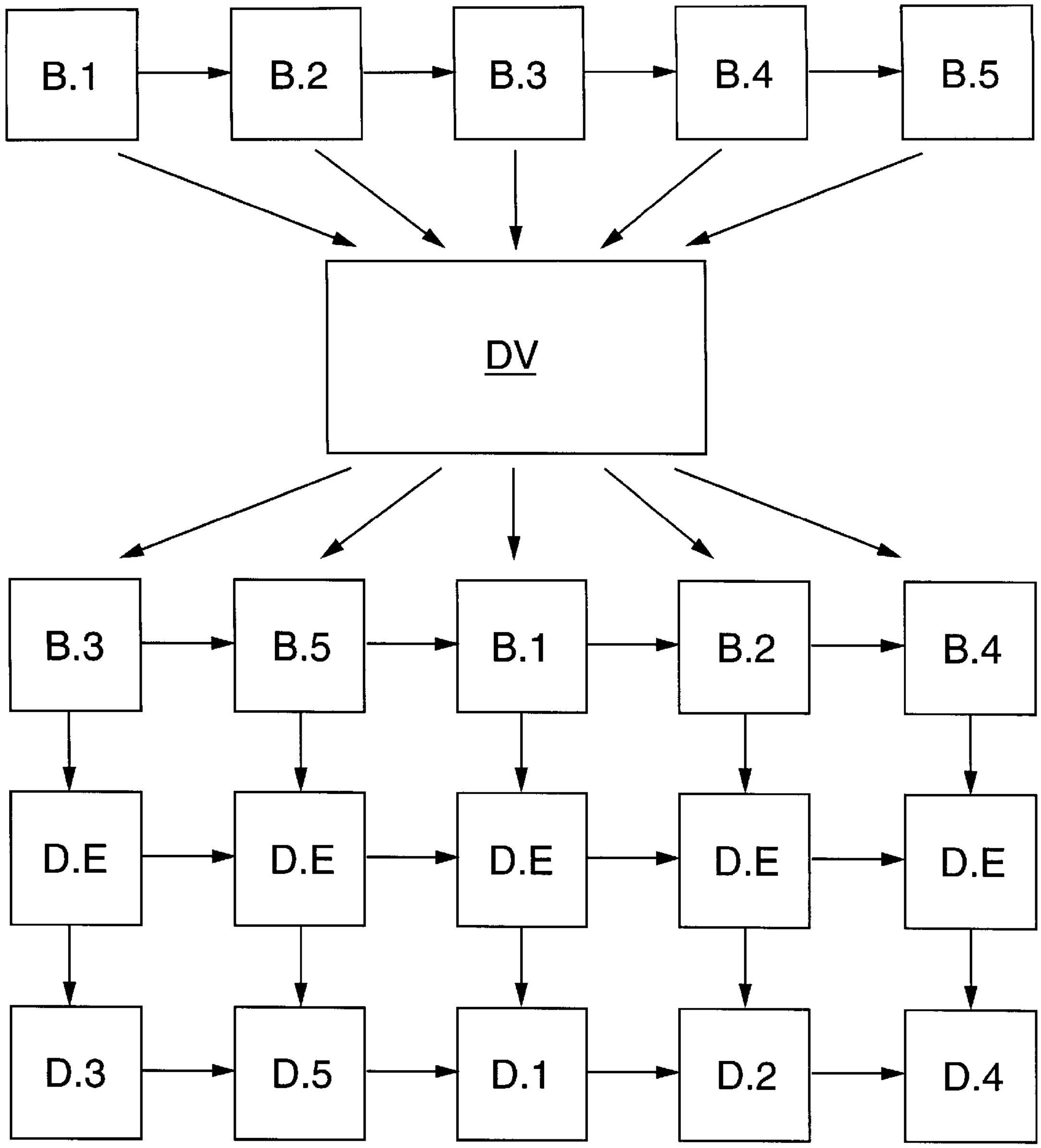
FIG. 1 illustrates a representational diagram of a print job carried out in accordance with an embodiment of the subject invention.
Figure 4:
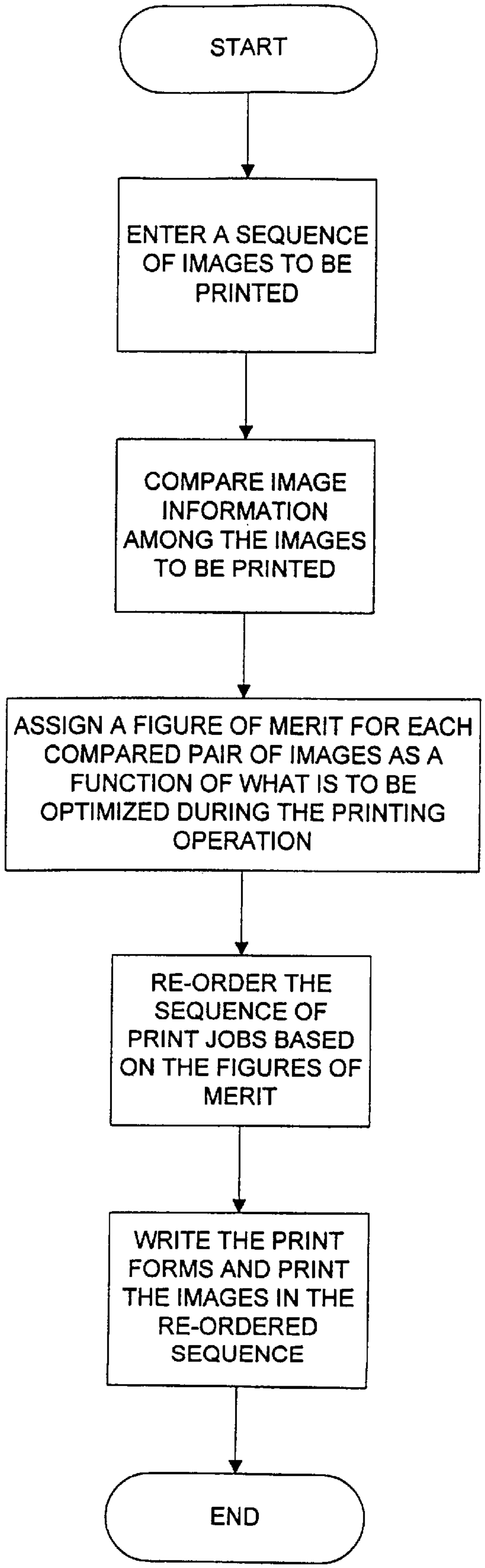
FIG. 4 illustrates a high level, schematic flow diagram of an embodiment of the invention.
Figure 5:
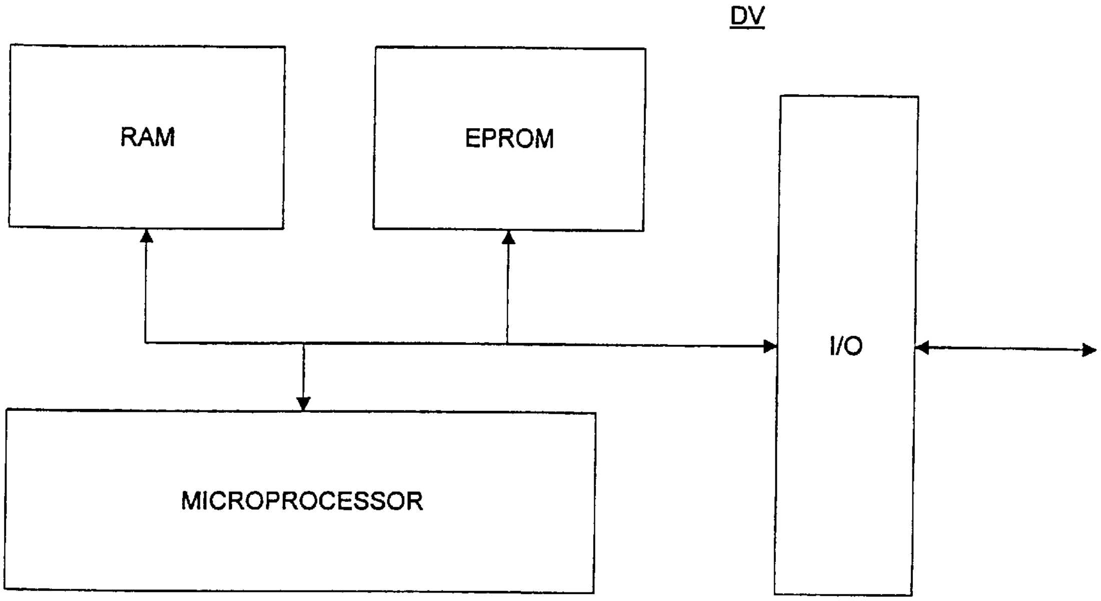
FIG. 5 illustrates a block diagram of the data processing device of FIGS. 1 and 3.
Figure 6:
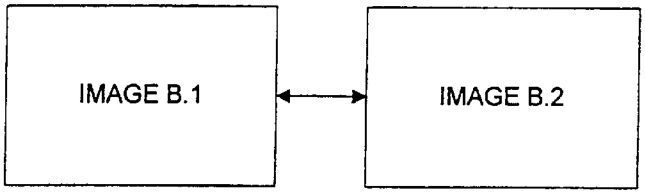
FIG. 6 illustrates a representational diagram of two images being compared in accordance with the invention illustrated in FIG. 1.

Referencing now to the FIGURES, wherein like reference symbols refer to like elements, there is shown in FIGS. 1 and 4 a first generalized exemplary embodiment of a method according to the invention. According to this exemplary embodiment, five print jobs are to be carried out in a single color having respective image contents of the entry sequence B.1, B.2, B.3, B.4, B.5. In the explanation of the general principle of the invention, the printing method with which the individual print jobs are then to be carried out is determined in a manner which will be described in greater detail below. For this example, an offset printing process is utilized which has a printing form which can be rewritten and erased point by point. To determine the sequence for printing, the entered individual image contents B. 1–B. 5 are first fed to a data processing device DV, illustrated in FIG. 5, which generally comprises a microprocessor, memory devices, such as a RAM and an EPROM, and appropriate processing hardware and/or software, and compared with one another as illustrated in FIG. 6, in terms of content pixel by pixel or in some other appropriate manner. In particular, the program to implement the method set forth herein is stored in the EPROM while the pixel data relating to the images are stored in the RAM. The data processing device DV may also be fed additional information which can be derived from the image contents B.1–B.5 of the individual print jobs in accordance with the printing process by means of which the individual print jobs are to be carried out.

Figure 3:
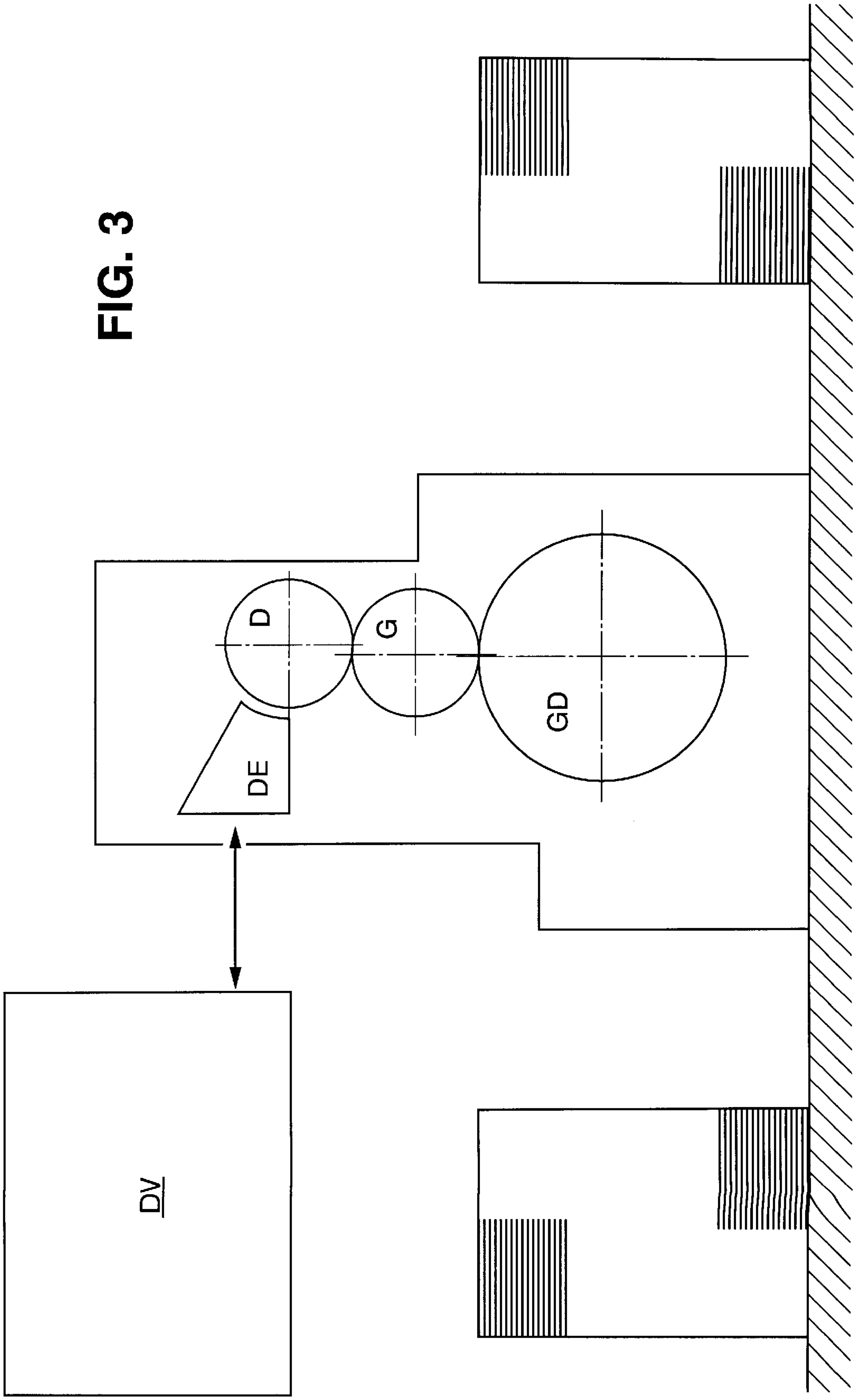
FIG. 3 illustrates a block diagram schematic of an embodiment of a printing machine in accordance with subject invention.

The data processing device DV, which may, for example, be a part of the printing machine illustrated in FIG. 3 or remotely associated therewith, resorts the individual image contents into an optimized printing sequence, for example, B.3, B.5, B.1, B.2, B.4. What is important here is that the data processing device DV performs to that effect a pixel-by-pixel comparison of the individual image contents according to the entry sequence B.1–B.5, so that the individual rewriting processes, when producing the printing form D.3, D.5, D.1, D.2, D.4 from the image contents B.3, B.5, B.1, B.2, B.4, is performed in a manner which is optimized in terms of time, in terms of the process, and/or in terms of economy of materials, so that the lowest possible number of pixel-by-pixel rewriting processes have to be performed.

Once the re-sorting is performed by the data processing device DV, the appropriate printing forms D.3, D.5, D.1, D.2, D.4 are now produced by one or more printing form generating devices DE in accordance with the sorted image contents B.3, B.5, B.1, B.2, B.4. It is indicated in FIG. 3 that this printing form generating device DE can be a device arranged in the printing machine D which, in the case of an offset printing machine, is constructed as a device, assigned to the plate or printing form cylinder P, for the point-by-point generation and erasure of printing components (ink-accepting/non-ink-accepting). In this case, it is important for the understanding of the exemplary embodiment outlined above that this is a printing process or an imaging process in which an existing printing form, for example the printing form D.5 having the image content B.5, can be rewritten by means of point-by-point erasure of ink-accepting regions or, respectively, by point-by-point generation of new ink-accepting regions in order to produce the printing form D.1 according to the image content B.1. At this point, it should be emphasized once more that the task and function of the data processing device DV indicated in FIG. 1 is to re-sort the image contents B.1–B.5 incoming in the entry sequence corresponding to the print jobs to be carried out in a process-oriented and execution-oriented manner, so that the individual rewriting processes for the individual printing forms require correspondingly few working steps and accordingly also need little time.

In the exemplary embodiment illustrated in FIG. 1, the image contents B.1–B.5 according to the entry sequence were re-sorted by the data processing device DV into a sequence of the image contents B.3, B.5, B.1, B.2, B.4, in order then to generate the corresponding printing forms D.3, D.5, D.1, D.2, D.4. During the rewriting process of the printing form D.3 to form the printing form D.5 (this in accordance with the sequence with which the print jobs were set up), only those parts of the printing form D.3 are erased or supplemented point by point by additional ink-accepting parts in order to generate the printing form D.5 according to the image content B.5.

According to the known direct imaging process for generating printing forms within the machine, if appropriate whole-area cleaning processes are necessary, with which the existing printing form freed of the ink after the completion of a printing form. A point-by-point erasure of ink-accepting parts is then performed, which means in the case of a flat printing method that ink-accepting regions are influenced, according to the image content, in such a way that following the appropriate processing step they are no longer ink-accepting. This can be performed in a known way by moving an appropriate writing or erasing head within the printing form generating device DE.

After the point-by-point erasure of ink-accepting regions of the previous print job, the point by point writing is then performed by causing the formation of ink-accepting regions on the printing form corresponding to the image content of the new print job. This is also performed by means of appropriate moving of a positionable writing/erasing head within the printing form generating device DE. In the case of a rewritable and erasable flat printing process, this means that the material of the rewritable and erasable printing form is retransferred from a state which was, for example, non-ink-accepting in the original state, into an ink-accepting state. As is sufficiently well known from the prior art, this may be performed, for example, by means of the point-by-point application of energy, for example by means of a laser.

The process described above for rewriting a printing form from the previous print job into a new print job corresponding to a process-optimized sequence is additionally illustrated with reference to FIG. 2. According to the example relating to FIG. 1, this is a rewriting process from the changeover of a job having the printing form D.5 to a new print job having the printing form D.1 according to the respective image contents B.5 and B.1. Since the sequence of image contents B.1–B.5 has already been sorted in a process-optimized manner, that is to say the print job with the image content B.1 is to be carried out after the print job having the image content B.5, there is as great an agreement as possible between the corresponding image contents. The printing form D.5 having the image content B.5 is illustrated to show the ink-accepting parts of the printing form. These ink-accepting parts are illustrated in hatched form.

In accordance with the printing method, the printing form D.5 having the image content B.5 is first transferred into an intermediate printing form D.5' by means of a first processing step by point-by-point generation of non-ink-accepting parts, the intermediate printing form having the intersecting set of image contents B. 1 and B. 5 as the printing area. As can be seen, by means of point-by-point generation of non-ink-accepting image parts, the printing form D.5 having the non-ink-accepting parts has been modified in accordance with the new image content B.1. By means of a second processing step, in which the correspondingly still remaining necessary ink-accepting parts are generated in accordance with the image content B.1, the intermediate printing form D.5' (intersection set of the image contents B.1 and B.5) is transferred into the final printing form D.1 corresponding to the image content B.1.

The above method according to the invention of re-sorting the print jobs according to the image contents in the entry sequence into a process-optimized execution sequence has been described using the flat printing method. In this case, FIG. 2 reproduces a total of two rewriting processes in order to generate a printing form D. 1 from a printing form D. 5 according to the image content B.5 into a printing form D.1 corresponding to the image content B.1. Instead of a rewriting process, as in the case of a flat printing process or directly imageable offset process, this may also be a rewritable and point-by-point erasable gravure process. Accordingly, the individual tiny bowls are then initially completely filled in point by point according to the differential image content (B.1/B.5), which corresponds to the generation of non-ink-accepting parts in flat printing. Thus, even in the case of the rewritable and erasable gravure process, this first produces an intermediate printing form D.5', in which this intermediate printing form D.5' has been produced following the point-by-point erasure or refilling of the corresponding tiny bowls of the initial printing form D.5. Using FIG. 2, it was thus explained that, both in the case of a point-by-point rewritable and erasable flat printing process and also in the case of a point-by-point rewritable and erasable gravure process, the transition from a printing form D.5 according to the image content B.5 to a printing form B.1 according to the image content B.1 is initially performed by generating an intermediate printing form D.5', which contains the intersecting set of the corresponding image contents B.1–B. 5. As already explained, the respective ink-accepting parts are reproduced in a hatched manner in the example according to FIG. 2, both in the case of the image contents B.1, B.5 and also in the case of the respective printing forms D.1, D.5.

In the above, the method according to the invention, performed by the data processing device DV was explained using a process-optimized resorting process using the image contents B.1–B.5. The process-optimized sorting of the image contents B.1–B.5 of various single-color print jobs was in this case performed exclusively with reference to the correspondingly necessary rewriting processes in order to generate the respective new printing form. The image contents of the various single-color print jobs B.1–B.5 were in this case re-sorted by the data processing device DV according to the invention into a sequence of image contents B.3, B.5, B.1, B.2, B.4 so that the corresponding rewriting processes, explained using FIG. 2, by the printing form generating device DE in each case need the lowest possible number of working steps or the lowest necessary time and/or power.

The job sequence, re-sorted by the data processing device DV, of the image contents B.3, B.5, B.1, B.2, B.4 was carried out to the effect that, as a result of the printing form generating device DE available on the printing machine D, the respective rewriting of the printing form D.3 into the printing form D.5, the rewriting of the printing form D.5 into the printing form D.1, the rewriting of the printing form D.1 into the printing form D.2 and the rewriting of the printing form D.2 into the printing form D.4 require the lowest possible number of working steps or the lowest possible working time. By means of a pixel-by-pixel comparison of the image contents B. 1–B. 5 of a corresponding entry sequence of the individual print jobs (single-color print jobs), it was then defined that a start was not to be made with the first print job according to the entry sequence, having the image content B.1, but with the third print job in the entry sequence, having the image content B.3. By means of the comparison of the individual image elements B. 1–B. 5, it was in this case determined that the necessary rewriting processes, beginning with a printing form D.3 corresponding to the image content B.3, constitutes the best starting situation for the following print jobs. Proceeding from the printing form D.3 having the corresponding image content B.3, in order to generate the printing form D.5, that is to say the second print job in the execution, it was necessary to perform the lowest possible number of processing steps in order to generate this printing form D.5. The situation arises in the same way for the rewriting of the printing form D.5 into the printing form D.1 according to the image content B.1.

FIG. 3 illustrates a block diagram, schematic representation of the printing installation according to the invention. Reproduced here is a single-color sheet-fed printing machine which operates in accordance with a rewritable and erasable flat printing principle, including a printing form cylinder D a printing form which can be modified by a printing form generating device DE in accordance with the image contents. In a manner known per se, following inking of the printing form on the printing form cylinder D, the printed image is then transferred by means of a blanket cylinder G onto the sheet-like material to be printed. The printing form generating device DE, which is assigned to the printing form cylinder D, is connected to the data processing device DV, by means of which the printing form generating device DE is fed the individual image information necessary for writing the printing form.

The data processing device DV carries out the sorting processes, explained with reference to FIGS. 1 and 2, as well as the appropriate control processes in order to generate the respective printing forms. What is important in the case of the present invention is that the in-going print jobs corresponding to the image contents B. 1–B. 5 are not carried out in the ingoing sequence but in a manner which is re-sorted so as to optimize the process and execution time. In the exemplary embodiment explained above, this concerns a total of five single-color print jobs having the image contents B.1–B.5 (entry sequence). Of course, by using the method according to the invention, as well as the printing installation constructed in accordance with the invention, given appropriate modification, it in also possible for multicolor print jobs to be re-sorted in a process-optimized manner by means of a point-by-point comparison of their image contents. In the case of two-color, three-color or multicolor print jobs, the image contents of the individual colors (following a color separation) are also compared with one another pixel by pixel for use in the re-sorting process. More particularly, in the case of two or multicolor printed material, the respective cyan, magenta, yellow and black separations (image contents) are compared with one another in order then, taking into account the rewriting processes necessary in each case to define a print job sequence which is in particular optimized with regard to the execution time.

Figure 2:
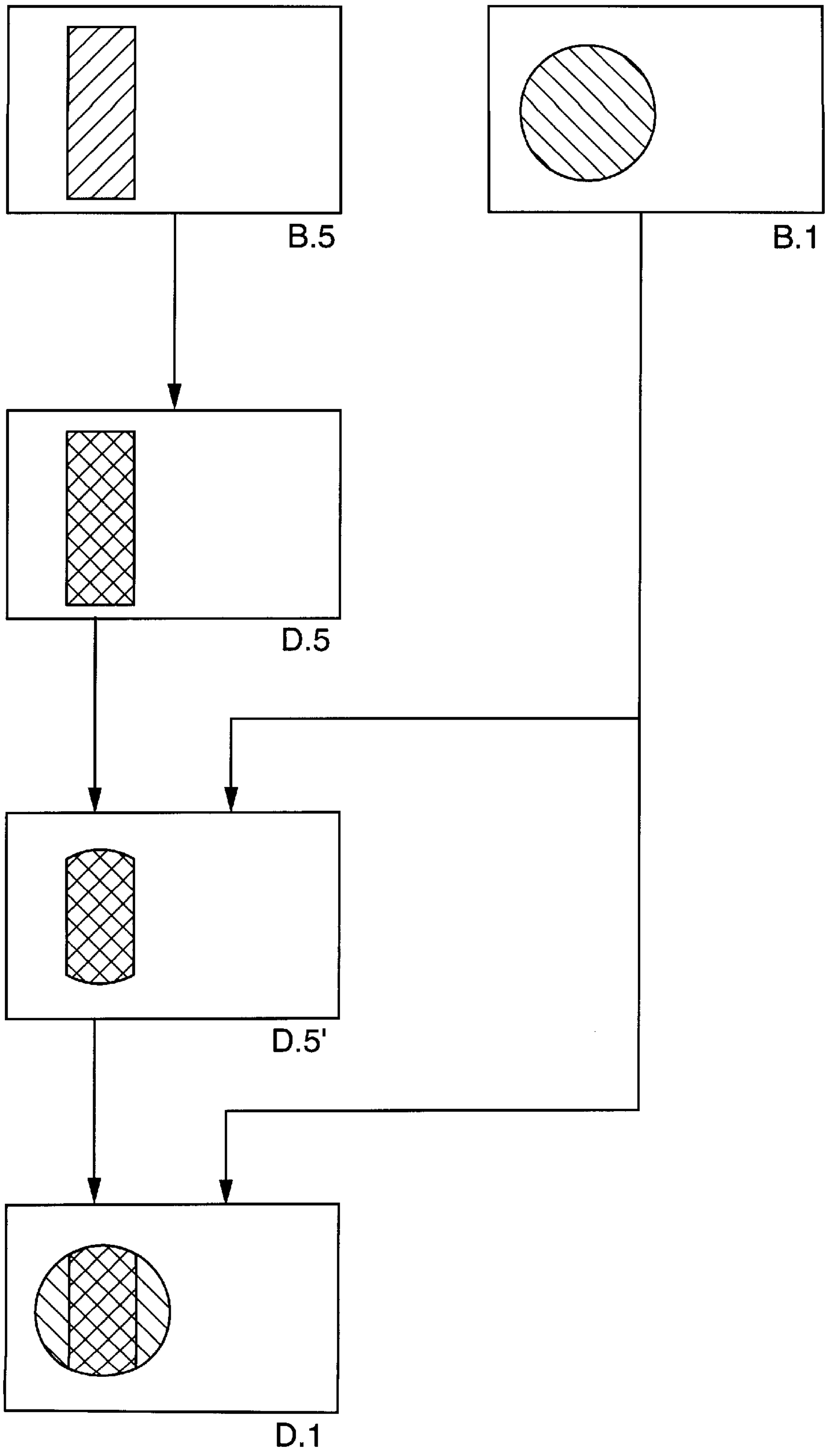
FIG. 2 illustrates the steps for performing a printing job in accordance with an embodiment of the invention.

In the above, using FIGS. 1 to 3, the method of re-sorting according to the image contents was explained in a process-optimized manner based on the necessary rewriting processes for the respective printing forms. it is likewise possible, during the definition of the sequence of the individual print jobs which finally comes to be executed, to take into account not only the rewriting processes necessary for the generation of the respective printing forms, but also the additional process parameters which can be derived from the image contents.

In the case of offset printing machines, in particular because of the ink storage capacity of the inking units, taking into account the film thickness distribution of the ink supply is suggested here. In the case of such a manner of sorting, it is additionally taken into account that when a printing machine is started up using a newly written printing form, a new ink distribution likewise has to be produced in the inking unit which also requires time. By means of the data processing device DV according to a further embodiment of the invention, the ink demand of the printing forms can be determined from the image contents, as by means of the known plate scanners, in order to define the proportions of printing areas, so that the readjustment times resulting therefrom can also be taken into account during the definition of the job sequence which is then to be-executed. In this case it can be advantageous, in the case of print jobs which have an ink requirement which is similar from one to the other, to configure the execution sequence of the individual print jobs in such a way that the individual slider settings in the ink metering devices only have to be changed to the slightest amount. In other cases, for example print jobs having several different ink requirements for the individual printing forms, it may, by contrast, be advantageous to allow a print job with, for example, a low ink demand to be followed by a print job having an overall higher ink application, since a very large ink flow difference (difference in film thickness profile) is produced as a result of the change in the ink feed (setting of the ink metering elements), which is equalized as rapidly as possible in accordance with ink flow laws. In this case, the data processing device DV would take into account not only the appropriate process steps for the rewriting or erasure of the corresponding image elements of the printing forms, but in addition, would likewise take into account the color demand of the individual printing forms, according to the image contents, on the basis of ink flow models.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalent thereof.

What is claimed is:

1. A method for the production of a plurality of print jobs having different image contents in which the individual print jobs are carried out one after another in a sequence and printing forms necessary for the production of the respective print job are set up from the image contents, the method comprising the steps of: determining the sequence in which the individual print jobs are carried out one after another by comparing the image contents belonging to the individual print jobs with one another in pairs for determining the changes which are respectively necessary to the printing forms to carry out a subsequent print job with a new image content with respect to a previous print job and ordering the sequence based in part upon the step of comparing.

2. The method according to claim 1, wherein the respective color separations for each print job are compared with one another for use in the step of ordering.

3. The method according to claim 1, wherein the image contents of the respective print jobs are compared with one another pixel-by-pixel.

4. The method according to claim 1, wherein a printing form of a print job which is carried out within the determined sequence is converted pixel-by-pixel into the printing form of the next print job with only those pixels in the print form which differ from the print form to be carried out experiencing processing.

5. The method according to claim 4, wherein the printing form is converted pixel by pixel into the printing form of the next print job by transferring into a non-printing state those pixels which are needed as non-printing components with respect to the next print job and then transferring into a printing state those pixels which are needed as printing components with respect to the next print job.

6. The method according to claim 4, wherein the printing form is converted pixel-by-pixel into the printing form of the next print job by transferring those pixels which are needed as printing components with respect to the next print job into a printing state and then transferring those pixels which are needed as non-printing components with respect to the next print job into a non-printing state.

7. The method according to claim 1, further comprising the step of checking whether a further print job can be inserted in the short term between at least one pair of print jobs, a reservation being performed for those print jobs whose image contents or variables which can be derived from the image contents lie within specific limits.

8. The method according to claim 1, in which the sequence in which the individual print jobs are carried out one after another is ordered in such a way that the number of working steps needed to change at least one printing form to the next printing form is minimal.

9. The method according to claim 1, wherein the sequence in which the individual print jobs are carried out one after another is ordered in such a way that the time necessary to change at lest one printing form to the next printing form is minimal.

10. The method according to claim 1, wherein the sequence in which the individual print jobs are carried out one after another is ordered in such a way that the time to change the ink profile and/or film thickness gradient in the inking unit of a printing machine carrying out the print jobs is minimal when changing from one printing form to the next printing form.

11. The method according to claim 1, wherein the sequence in which the individual print jobs are carried out one after another is ordered in such a way that the number of machine revolutions of a printing machine carrying out the print jobs to change the ink profile and/or film thickness gradient in the inking unit is minimal when changing from at least one printing form to the next printing form.

12. The method according to claim 1, wherein setting data serving for the operation of the printing machine carrying out the print jobs is derived from the image contents of the individual print jobs and the sequence in which the individual print jobs are carried out one after another is ordered in such a way that the setting time needed to change from at least one print job to the next print job is minimal.

13. The method according to claim 1, wherein setting data serving for the operation of the printing machine carrying out the print jobs is derived from the image contents of the individual print jobs and the sequence in which the individual print jobs are carried out one after another is ordered in such a way that the number of working steps needed to change from at least one print job to the next print job is minimal.

14. The method according to claim 1, wherein the sequence in which the individual print jobs are carried out one after another is ordered in such a way that the power required to change at least one printing from to the next printing form is minimal.

15. The method according to claim 1, wherein the sequence in which the individual print jobs are carried out one after another is determined anew by comparing the image contents of all the remaining image contents following the print job being carried out.

16. A device for producing a plurality of print jobs having different image contents, comprising: a printing machine by which print jobs can be produced in accordance with the image contents, a storage device for the accommodation of two or more of the image contents which are capable of being fed from the storage device to the printing machine, and a data processing device for controlling the feeding of the image contents from the storage device to the printing machine in a sequence in which the individual print jobs are to be carried out one after another which sequence is determined in part by comparing the image contents belonging to the individual print jobs with one another in pairs and determining the changes necessary in the printing machine to effectuated a change in printing jobs relating to the respective image contents.

17. The device according to claim 16, wherein the data processing device further utilizes a comparison of the respective color of the image contents when determining the sequence.

18. The device according to claim 16, in which the data processing device determine the sequence in which the individual print jobs are carried out one after another in such a way that the number of working steps in the printing machine needed to change at least one printing job to the next printing job is minimal.

19. The device according to claim 16, wherein the data processing device determines the sequence in which the individual print jobs are carried out one after another in such a way that the time to change an inking unit of the printing machine is minimal when changing from one print job to the next print job.

20. The device according to claim 16, wherein the data processing device determines the sequence in which the individual print jobs are carried out one after another in such a way that the number of machine revolutions of the printing machine carrying out the print jobs to change an ink profile and/or film thickness gradient in an inking unit thereof is minimal when changing from one printing job to the next printing job.

21. The device according to claim 16, wherein the data processing device determines the sequence in which the individual print jobs are carried out one after another in such a way that the power required to change at least one print job to the next print job is minimal.

22. The device according to claim 16, wherein the data processing device compares the image contents with one another pixel by pixel.

* * * * *